(12) United States Patent
Yoshimura et al.

(10) Patent No.: US 6,461,770 B1
(45) Date of Patent: Oct. 8, 2002

(54) LITHIUM BATTERY COMPRISING A POSITIVE ELECTRODE MATERIAL OF LITHIUM-MANGANESE COMPLEX OXIDE CONTAINING BORON AND PHOSPHORUS

(75) Inventors: Seiji Yoshimura, Hirakata (JP); Taeko Ota, Osaka (JP); Shin Fujitani, Hirakata (JP); Nobuhiro Nishiguchi, Sumoto (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 65 days.

(21) Appl. No.: 09/630,675

(22) Filed: Aug. 1, 2000

(30) Foreign Application Priority Data

Aug. 4, 1999 (JP) .......................................... 11-220597

(51) Int. Cl.$^7$ ................................................ H01M 4/24
(52) U.S. Cl. ................................... 429/231.95; 429/224
(58) Field of Search ............................ 429/231.95, 224

(56) References Cited

U.S. PATENT DOCUMENTS 5,578,395 A * 11/1996 Yoshimura et al. ......... 429/197

FOREIGN PATENT DOCUMENTS

| JP | 63-114064 | 5/1988 |
|---|---|---|
| JP | 1-235158 | 9/1989 |
| JP | 4-237970 | 8/1992 |
| JP | 9-265984 | 10/1997 |

* cited by examiner

Primary Examiner—Gabrielle Brouillette
Assistant Examiner—M. Wills
(74) Attorney, Agent, or Firm—Armstrong, Westerman & Hattori, LLP

(57) ABSTRACT

A lithium battery comprising a positive electrode, a negative electrode and a nonaqueous electrolyte containing a a solute and a solvent, wherein the positive electrode comprises a positive-electrode active material of lithium-manganese complex oxide containing boron and phosphorus.

14 Claims, 1 Drawing Sheet

LITHIUM BATTERY COMPRISING A POSITIVE ELECTRODE MATERIAL OF LITHIUM-MANGANESE COMPLEX OXIDE CONTAINING BORON AND PHOSPHORUS

BACKGROUND OF THE INVENTION

1. Field of the Invention

The present invention relates to a lithium battery comprising a positive electrode, a negative electrode, and a nonaqueous electrolyte containing a solute and a solvent, and more particularly, to a lithium battery improved in charge/discharge cycle performance through suppression of reaction between a positive-electrode active material of the positive electrode and the nonaqueous electrolyte.

2. Description of the Related Art

Recently, rechargeable batteries have found applications in various fields such as electronics. As a novel battery of high power and high energy density, in particular, lithium batteries featuring high electromotive force derived from oxidation/reduction of lithium in the nonaqueous electrolyte have come into wide use.

Such lithium batteries have conventionally employed various metal oxides capable of absorbing and desorbing lithium ions as the positive-electrode active material for use in the positive electrode. More recently, studies have been made on the use of manganese oxides, such as manganese dioxide, as the positive-electrode active material of the lithium battery because manganese oxides generally provide high discharge potentials and are inexpensive.

Unfortunately, in charge/discharge processes of the lithium battery including the positive-electrode active material of manganese oxide, the manganese oxide is repeatedly expanded and contracted so that the crystal structure thereof is destroyed. As a result, the battery suffers a degraded charge/discharge cycle performance.

In recent attempts to improve the charge/discharge cycle performance of the lithium battery including the positive-electrode active material of manganese oxide, a variety of positive-electrode active materials have been proposed. For instance, Japanese Unexamined Patent Publication No.63-114064(1988) discloses a positive-electrode active material comprising a lithium-manganese complex oxide obtained from manganese dioxide and $Li_2MnO_3$. Japanese Unexamined Patent Publication No.1-235158 (1989) provides a positive-electrode active material comprising a complex oxide of lithium-containing manganese dioxide wherein lithium is incorporated in the crystal lattice of manganese dioxide. Further, Japanese Unexamined Patent Publication Nos.4-237970(1992) and 9-265984(1997) disclose positive-electrode active materials comprising lithium-manganese complex oxides added with boron.

Although the lithium batteries using the positive-electrode active materials of the official gazettes are improved in the charge/discharge cycle performance to some degree, there still exists a problem that the positive-electrode active material reacts with the nonaqueous electrolyte in the battery, degrading the charge/discharge cycle performance. On the other hand, the recent electronics with higher performances demand a lithium battery further improved in the charge/discharge cycle performance.

SUMMARY OF THE INVENTION

The invention is directed to a lithium battery comprising a positive electrode, a negative electrode, and a nonaqueous electrolyte containing a solute and a solvent, the battery adapted to suppress the reaction between a positive-electrode active material of the positive electrode and the nonaqueous electrolyte for achieving an excellent charge/discharge cycle performance.

A lithium battery according to the invention comprises a positive electrode, a negative electrode and a nonaqueous electrolyte containing a solute and a solvent, wherein the positive electrode comprises a positive-electrode active material of lithium-manganese complex oxide containing boron and phosphorus.

In the inventive lithium battery wherein the positive-electrode active material is the lithium-manganese complex oxide containing boron and phosphorus, boron and phosphorus in the positive-electrode active material are believed to suppress the reaction of the lithium-manganese complex oxide with the nonaqueous electrolyte during charging, thereby preventing dissolution of the positive-electrode active material in the nonaqueous electrolyte. This suppresses increase in the internal resistance of the lithium battery and hence, the battery is improved in the charge/discharge cycle performance.

For more positive suppression of the reaction between the positive-electrode active material and the nonaqueous electrolyte during charging, the solute in the nonaqueous electrolyte of the inventive lithium battery may preferably comprise at least one substance selected from the group consisting of lithium trifluoromethanesulfonate, lithium trifluoromethanesulfonimide, lithium pentafluoroethanesulfonimide, lithium trifluoromethanesulfonmethide and lithium hexafluorophosphate. More preferably, the solute may include at least one substance selected from the group of lithium trifluoromethanesulfonate and lithium trifluoromethanesulfonimide.

According to the inventive lithium battery, known solvents generally used in the art may be employed as the solvent for the nonaqueous electrolyte. However, for particular purposes of suppressing the reaction between the nonaqueous electrolyte and the positive-electrode active material as well as of increasing the ionic conductivity of the nonaqueous electrolyte, it is preferred to use a solvent mixture containing at least one organic solvent selected from the group consisting of ethylene carbonate, propylene carbonate, butylene carbonate, vinylene carbonate, γ-butyrolactone and sulfolane, and at least one organic solvent selected from the group consisting of 1,2-dimethoxyethane, 1,2-diethoxyethane, 1,2-ethoxymethoxyethane, tetrahydrofuran, dioxolane, dimethyl carbonate, diethyl carbonate and ethylmethyl carbonate. For proper suppression of the reaction between the positive-electrode active material and the nonaqueous electrolyte, the solvent mixture in the nonaqueous electrolyte may preferably contain the two types of organic solvents in respective concentrations of not less than 10 vol %.

According to the inventive lithium battery, the positive-electrode active material of lithium-manganese complex oxide containing boron and phosphorus may be obtained by heat-treating a mixture of a boron compound, phosphorus compound, lithium compound and manganese compound in the presence of oxygen, the mixture containing boron, phosphorus, lithium and manganese in an atomic ratio (B:P:Li:Mn) of 0.01–0.20:0.01–0.10:0.1–2.0:1.

Such a heat-treatment yields lithium-manganese complex oxide crystals incorporating therein boron or boron compound in an atomic ratio (B/Mn) of boron to manganese in the range of 0.01 to 0.20 and phosphorus or phosphorus compound in an atomic ratio (P/Mn) of phosphorus to manganese in the range of 0.01 to 0.10.

If the lithium-manganese complex oxide crystals incorporate therein boron or boron compound in the atomic ratio (B/Mn) of 0.01 to 0.20 and phosphorus or phosphorus compound in the atomic ratio (P/Mn) of 0.01 to 0.10, boron and phosphorus in the positive-electrode active material contribute adequate suppression of the reaction between the lithium-manganese complex oxide and the nonaqueous electrolyte during charging. Besides, such a composition obviates problems that boron and phosphorus uninvolved in the charge/discharge process account for too great a portion and that the positive-electrode active material suffers an instable crystal structure due to such excess boron and phosphorus failing to form a proper solid solution with the lithium-manganese complex oxide. Thus, the lithium battery is improved in the charge/discharge cycle performance with the properly suppressed reaction between the positive-electrode active material and the nonaqueous electrolyte.

In the preparation of the lithium-manganese complex oxide containing boron and phosphorus, examples of a usable boron compound include boron oxide $B_2O_3$, boric acid $H_3BO_3$, metaboric acid $HBO2$, lithium metaborate $LiBO_2$, quaternary lithium borate $Li_2B_4O_7$ and the like. Examples of a usable phosphorus compound include phosphoric acid $H_3PO_4$, lithium phosphate $Li_3PO_4$ and the like. Examples of a usable lithium compound include lithium hydroxide LiOH, lithium carbonate $Li_2CO_3$, lithium oxide $Li_2O$, lithium nitrate $LiNO_3$ and the like. Examples of a usable manganese compound include manganese dioxide $MnO_2$, manganese oxyhydroxide MnOOH and the like. As an alternative method to the above wherein the boron compound and the manganese compound are individually added to yield the lithium-manganese complex oxide containing boron and phosphorus, there may be used phosphoric acid-containing manganese dioxide given by an electrolyte bath with phosphoric acid added thereto.

In the heat-treatment of the boron compound, phosphorus compound, lithium compound and manganese compound for giving the positive-electrode active material, temperatures below 150° C. will result in insufficient incorporation of boron or boron compound and phosphorus or phosphorus compound into the lithium-manganese complex oxide solid and also in insufficient removal of water of crystallization of manganese dioxide. The residual water of crystallization reacts with lithium so as to degrade storability of the lithium battery. On the other hand, heat-treatment temperatures in excess of 430° C. will result in decomposed manganese dioxide so that the resultant complex oxide presents an insufficient mean manganese valence. This leads to the instable crystal structure of the positive-electrode active material, which, in turn, tends to react with the nonaqueous electrolyte, degrading the charge/discharge cycle performance of the lithium battery. Therefore, the boron compound, phosphorus compound, lithium compound and manganese compound may be heat-treated at temperatures of 150° C. to 430° C., preferably of 250° C. to 430° C., or more preferably of 300° C. to 430° C.

If the boron compound, phosphorus compound, lithium compound and manganese compound are heat-treated in such a manner, boron or the boron compound and phosphorus or the phosphorus compound form a proper solid solution with the lithium-manganese complex oxide without altering the crystal structure thereof. Thus is maintained the crystal structure combining $Li_2MnO_3$ and $MnO_2$ and featuring an excellent charge/discharge cycle performance.

In the inventive lithium battery, examples of a usable negative-electrode active material of the negative electrode include lithium metals generally used in the art; lithium alloys such as lithium-aluminum alloy, lithium-lead alloy, lithium-tin alloy and the like; and carbon materials capable of absorbing and desorbing lithium ions such as graphite, coke and the like. Where the negative-electrode active material is a lithium-aluminum alloy, in particular, the nonaqueous electrolyte forms an ion conductive film over a surface of the negative-electrode active material. The film serves to suppress the reaction of the negative-nelectrode active material with the nonaqueous electrolyte, thereby further improving the charge/discharge cycle performance of the lithium battery.

These and other objects, advantages and features of, the invention will become apparent from the following description thereof taken in conjunction with the accompanying drawing which illustrates a specific embodiment of the invention.

DESCRIPTION OF THE PREFERRED EMBODIMENTS

Figure 1:
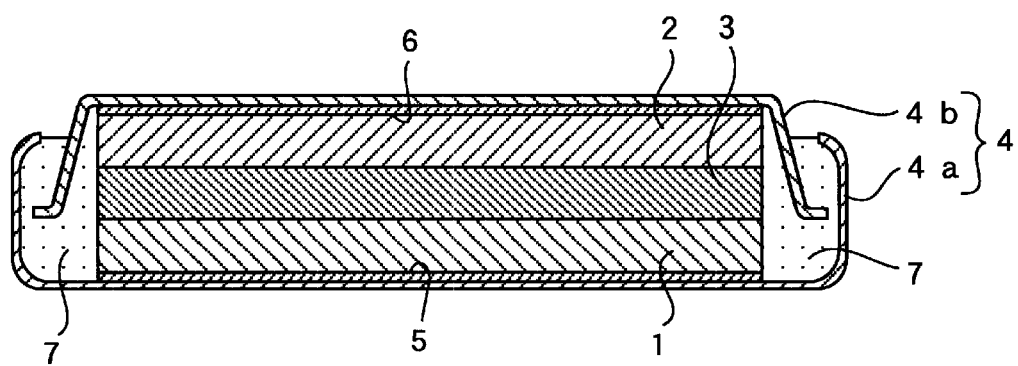
FIG. 1 is a sectional view explanatory of an internal construction of a lithium battery fabricated in inventive examples and comparative examples.

Now, the lithium battery according to the invention will be described in detail by way of specific examples thereof while comparative examples will be cited to demonstrate that the examples of the inventive lithium battery are improved in the charge/discharge cycle performance. It is to be noted that the lithium battery of the invention is not limited to the following examples and suitable modifications may be made thereto within the scope of the invention.

EXAMPLE 1

In Example 1, a positive electrode 1 and a negative electrode 2 were fabricated in the following manners while a nonaqueous electrolyte was prepared as follows. Then, a flat coin-type lithium battery was fabricated as shown in FIG. 1.

<Fabrication of Positive Electrode>

The positive electrode was fabricated as follows. First, there was prepared a mixture of lithium hydroxide LiOH, boron oxide $B_2O_3$, manganese dioxide $MnO_2$ containing phosphoric acid in a phosphorus-to-manganese atomic ratio (P/Mn) of 0.10 and phosphoric acid-free manganese dioxide $MnO_2$, the mixture containing lithium, boron, phosphorus and manganese in an atomic ratio (Li:B:P:Mn) of 0.56:0.10:0.02:1. The resultant mixture was subjected to 20-hour heat-treatment at 375° C. in the atmosphere. The mixture was then ground to give a powdery positive-electrode active material of lithium-manganese complex oxide containing boron and phosphorus.

The lithium-manganese complex oxide containing boron and phosphorus was subjected to X-ray diffraction analysis. The X-ray diffraction pattern showed a peak of $Li_2MnO_3$ and a peak of $MnO_2$ which was slightly shifted to the lower angle side from the inherent peak position. It is believed that because of lithium incorporated into the $MnO_2$ solid, the $MnO_2$ peak was shifted to the lower angle side in the X-ray diffraction pattern.

Next, the powdery lithium-manganese complex oxide containing boron and phosphorus, as the positive-electrode active material, a powdery carbon black as a conductive agent, and a powdery polytetrafluoroethylene as a binder were blended together in a weight ratio of 85:10:5. The resultant positive-electrode active mixture was cast into disc which was dried in vacuum at 250° C. for two hours. Thus was obtained the positive electrode.

<Fabrication of Negative Electrode>

The negative electrode was prepared by punching out a disc from a lithium-aluminum alloy sheet electrochemically produced.

<Preparation of Nonaqueous Electrolyte>

The nonaqueous electrolyte was prepared as follows. A solvent mixture was prepared by blending propylene carbonate (PC) and 1,2-dimethoxyethane (DME) in a volume ratio of 1:1. Then, lithium trifluoromethanesulfonimide LiN$(CF_3SO_2)_2$, as a solute, was dissolved in the resultant solvent mixture in a concentration of 1 mol/l.

<Fabrication of Battery>

A flat coin-type lithium battery having a diameter of 24 mm and a thickness of 3 mm was fabricated in the following manner. A separator 3 was prepared by immersing a polypropylene porous film in the above nonaqueous electrolyte. As shown in FIG. 1, the separator 3 was sandwiched between the positive electrode 1 and negative electrode 2 and placed in a battery case 4 consisting of a positive electrode can 4a and a negative electrode can 4b. The positive electrode 1 was connected to the positive electrode can 4a via a positive electrode collector 5 formed of a stainless sheet (SUS316) whereas the negative electrode 2 was connected to the negative electrode can 4b via a negative electrode collector 6 formed of a stainless sheet (SUS304). The positive electrode can 4a and negative electrode can 4b were electrically isolated from each other by means of a polypropylene insulation packing 7. A precharge internal resistance of the lithium battery was determined to be about 10Ω.

EXAMPLES 2 to 7

Examples 2 to 7 were different from Example 1 in that positive-electrode active materials of lithium-manganese complex oxides containing boron and phosphorus were prepared using the following ingredients in varied mixing ratios, the ingredients including lithium hydroxide LiOH, boron oxide $B_2O_3$, manganese dioxide $MnO_2$ containing phosphoric acid in an atomic ratio (P/Mn) of phosphoric acid to manganese of 0.10, and phosphoric acid-free manganese dioxide $MnO_2$. As shown in Table 1 below, Example 2 blended these ingredients in an atomic ratio (Li:B:P:Mn) of 0.515:0.01:0.02:1; Example 3 blended them at an atomic ratio of 0.535:0.05:0.02:1; Example 4 blended them at an atomic ratio of 0.585:0.15:0.02:1; Example 5 blended them at an atomic ratio of 0.61:0.20:0.02:1; Example 6 blended them at an atomic ratio of 0.555:0.10:0.01:1; and Example 7 blended them at an atomic ratio of 0.60:0.10:0.10:1. Except for this, the same procedure as in Example 1 was taken to fabricate the respective positive electrodes.

Using the resultant positive electrodes, lithium batteries of Examples 2 to 7 were fabricated the same way as in Example 1.

COMPARATIVE EXAMPLE 1

Comparative Example 1 took the same procedure as in Example 1 to fabricate a positive electrode except that a positive-electrode active material was prepared using a mixture containing lithium hydroxide LiOH and phosphoric acid-free manganese dioxide $MnO_2$ in an atomic ratio (Li:Mn) of 0.50:1, thus dispensing with a boron compound and phosphoric acid-containing manganese dioxide $MnO_2$.

Using the resultant positive electrode, a lithium battery of Comparative Example 1 was fabricated the same way as in Example 1.

COMPARATIVE EXAMPLE 2

Comparative Example 2 took the same procedure as in Example 1 to fabricate a positive electrode except that a positive-electrode active material was prepared using a mixture containing lithium hydroxide LiOH, boron oxide $B_2O_3$ and phosphoric acid-free manganese dioxide $MnO_2$ in an atomic ratio (Li:B:Mn) of 0.60:0.10:1, thus dispensing with phosphoric acid-containing manganese dioxide $MnO_2$.

Using the resultant positive electrode, a lithium battery of Comparative Example 2 was fabricated the same way as in Example 1.

COMPARATIVE EXAMPLE 3

Comparative Example 3 took the same procedure as in Example 1 to fabricate a positive electrode except that a positive-electrode active material was prepared by using a mixture containing lithium hydroxide LiOH and phosphoric acid-containing manganese dioxide $MnO_2$ with a phosphorus-to-manganese atomic ratio (P/Mn) of 0.10 in an atomic ratio (Li:P:Mn) of 0.535:0.02:1, thus dispensing with a boron compound.

Using the resultant positive electrode, a lithium battery of Comparative Example 3 was fabricated the same way as in Example 1.

The lithium batteries of Examples 1 to 7 and Comparative Example 1 to 3 were each charged and discharged in cycles, each cycle consisting of charging at 10 mA charge current to a charge end voltage of 3.2 V followed by discharging at 10 mA discharge current to a discharge end voltage of 2.0 V. Each battery was determined for the initial discharge capacity at cycle 1 as well as the number of cycles before a discharge capacity decline to less than half the initial discharge capacity. The results are listed in Table 1 as below.

TABLE 1

| | atomic ratio | | | | number of |
|---|---|---|---|---|---|
| | Li | B | P | Mn | cycles |
| example 1 | 0.56 | 0.10 | 0.02 | 1 | 65 |
| example 2 | 0.515 | 0.01 | 0.02 | 1 | 60 |
| example 3 | 0.535 | 0.05 | 0.02 | 1 | 62 |
| example 4 | 0.585 | 0.15 | 0.02 | 1 | 62 |
| example 5 | 0.61 | 0.20 | 0.02 | 1 | 60 |
| example 6 | 0.555 | 0.10 | 0.01 | 1 | 60 |
| example 7 | 0.60 | 0.10 | 0.10 | 1 | 60 |
| comparative example 1 | 0.50 | 0 | 0 | 1 | 21 |
| comparative example 2 | 0.60 | 0.10 | 0 | 1 | 55 |
| comparative example 3 | 0.535 | 0 | 0.02 | 1 | 40 |

As apparent from the results, the lithium batteries of Examples 1 to 7 employing the positive-electrode active material of lithium-manganese complex oxide containing boron and phosphorus have attained greater improvement in the charge/discharge cycle performance with notable increase in the number of cycles before the decline to less than half the initial discharge capacity, as compared to that of Comparative Example 1 employing the positive-electrode active material of lithium-manganese complex oxide free of boron and phosphorus. Further, the batteries of these examples exhibit superior charge/discharge cycle performances over those of Comparative Examples 2, 3 employing the positive-electrode active material of lithium-manganese complex oxide containing either boron or phosphorus.

EXAMPLES 8 to 11

Examples 8 to 11 were different from Example 1 only in the type of solute for the nonaqueous electrolyte. As shown in Table 2 below, Example 8 used lithium pentafluoroethanesulfonimide $LiN(C_2F_5SO_2)_2$; Example 9 used lithium trifluoromethanesulfonmethide $LiC(CF_3SO_2)_3$; Example 10 used lithium trifluoromethanesulfonate $LiCF_3SO_3$; and Example 11 used lithium hexafluorophosphate $LiPF_6$. Nonaqueous electrolytes of these examples were prepared using such solutes.

Except for this, the same procedure as in Example 1 was taken to fabricate the respective lithium batteries.

Similarly to Examples 1 to 7 and Comparative Examples 1 to 3, the batteries of Examples 8 to 11 were each determined for the number of cycles before the decline to less than half the initial discharge capacity. The results, along with that of Example 1, are listed in Table 2 as below.

TABLE 2

|  | solute in nonaqueous electrolyte | number of cycles |
|---|---|---|
| example 1 | $LiN(CF_3SO_2)_2$ | 65 |
| example 8 | $LiN(C_2F_5SO_2)_2$ | 62 |
| example 9 | $LiC(CF_3SO_2)_3$ | 60 |
| example 10 | $LiCF_3SO_3$ | 65 |
| example 11 | $LiPF_6$ | 60 |

As to the case where the positive-electrode active material is the lithium-manganese complex oxide containing boron and phosphorus, the results show that the lithium batteries of Examples 8 to 11, like that of Example 1, have attained greater improvement in the charge/discharge cycle performance with notable increase in the number of cycles before the decline to less than half the initial discharge capacity, as compared to those of Comparative Examples 1 to 3. Example 1 employed $LiN(CF_3SO_2)_2$ as the solute for the nonaqueous electrolyte, whereas Examples 8 to 11 respectively employed $LiN(C_2F_5SO_2)_2$, $LiC(CF_3SO_2)_3$, $LiCF_3SO_3$ and $LiPF_6$, as the solute. Particularly an excellent charge/discharge cycle performance is achieved by the batteries of Example 1 and 10 employing $LiN(CF_3SO_2)_2$ and $LiCF_3SO_3$ as the solute for the nonaqueous electrolyte, respectively.

EXAMPLES 12 to 23

Examples 12 to 23 were different from Example 1 only in the type of solvent for the nonaqueous electrolyte. As shown in Table 3 below, Example 12 used a solvent mixture of ethylene carbonate (EC) and 1,2-dimethoxyethane (DME); Example 13 used a solvent mixture of butylene carbonate (BC) and 1,2-dimethoxyethane (DME); Example 14 used a solvent mixture of vinylene carbonate (VC) and 1,2-dimethoxyethane (DME); Example 15 used a solvent mixture of γ-butyrolactone (γ-BL) and 1,2-dimethoxyethane (DME); Example 16 used a solvent mixture of sulfolane (SL) and 1,2-dimethoxyethane (DME); Example 17 used a solvent mixture of propylene carbonate (PC) and 1,2-diethoxyethane (DEE); Example 18 used a solvent mixture of propylene carbonate (PC) and 1,2-ethoxymethoxyethane (EME); Example 19 used a solvent mixture of propylene carbonate (PC) and tetrahydrofuran (THF); Example 20 used a solvent mixture of propylene carbonate (PC) and dioxolane (DOXL); Example 21 used a solvent mixture of propylene carbonate (PC) and dimethyl carbonate (DMC); Example 22 used a solvent mixture of propylene carbonate (PC) and diethyl carbonate (DEC); and Example 23 used a solvent mixture of propylene carbonate (PC) and ethylmethyl carbonate (EMC). In the respective examples, the nonaqueous electrolyte was prepared using the solvent mixture containing these solvents in a volume ratio of 1:1.

Using the resultant nonaqueous electrolytes, batteries of Examples 12 to 23 were fabricated the same way in Example 1.

Similarly to Examples 1 to 7 and Comparative Examples 1 to 3, the batteries of Examples 12 to 23 were each determined for the number of cycles before the decline to less than half the initial discharge capacity. The results, along with that of Example 1, are listed in Table 3 as below.

TABLE 3

|  | solvent in nonaqueous electrolyte (vol ratio) | number of cycles |
|---|---|---|
| example 1 | PC:DME (1:1) | 65 |
| example 12 | EC:DME (1:1) | 63 |
| example 13 | BC:DME (1:1) | 61 |
| example 14 | VC:DME (1:1) | 64 |
| example 15 | γ-BL:DME (1:1) | 64 |
| example 16 | SL:DME (1:1) | 63 |
| example 17 | PC:DEE (1:1) | 65 |
| example 18 | PC:EME (1:1) | 59 |
| example 19 | PC:THF (1:1) | 62 |
| example 20 | PC:DOXL (1:1) | 61 |
| example 21 | PC:DMC (1:1) | 59 |
| example 22 | PC:DEC (1:1) | 64 |
| example 23 | PC:EMC (1:1) | 62 |

As to the case where the positive-electrode active material is the lithium-manganese complex oxide containing boron and phosphorus, the results show that the lithium batteries of Examples 12 to 23, like that of Example 1, have attained greater improvement in the charge/discharge cycle performance with notable increase in the number of cycles before the decline to less than half the initial discharge capacity, as compared to those of Comparative Examples 1 to 3. Examples 12 to 23 used the solvent mixture for the nonaqueous electrolyte which contained at least one organic solvent selected from the group consisting of ethylene carbonate, propylene carbonate, butylene carbonate, vinylene carbonate, γ-butyrolactone and sulfolane and at least one organic solvent selected from the group consisting of 1,2-dimethoxyethane, 1,2-diethoxyethane, 1,2-ethoxymethoxyethane, tetrahydrofuran, dioxolane, dimethyl carbonate, diethyl carbonate and ethylmethyl carbonate.

EXAMPLE 24

In the fabrication of a positive electrode, Example 24 used the same ingredients as in Example 1 for preparation of a positive-electrode active material of lithium-manganese complex oxide containing boron and phosphorus. There was prepared a mixture which contained lithium hydroxide LiOH, boron oxide $B_2O_3$, phosphoric acid-containing manganese dioxide $MnO_2$ with a phosphorus-to-manganese atomic ratio (P/Mn) of 0.10 and phosphoric acid-free manganese dioxide $MnO_2$ in an atomic ratio (Li:B:P:Mn) of 0.56:0.10:0.02:1. The resultant mixture was heat-treated at 250° C. as shown in Table 4 below. Except for this, the same procedure as in Example 1 was taken to fabricate the positive electrode.

Using the resultant positive electrode, a lithium battery of Example 24 was fabricated the same way as in Example 1.

Similarly to Examples 1 to 7 and Comparative Examples 1 to 3, the battery of Example 24 was determined for the number of cycles before the decline to less than half the initial discharge capacity. The result, along with that of Example 1, is listed in Table 4 as below.

TABLE 4

| | heat-treatment temperature (° C.) | number of cycles |
|---|---|---|
| example 24 | 250 | 60 |
| example 1 | 375 | 65 |

As apparent from the results, the lithium battery of Example 24 have attained greater improvement in the charge/discharge cycle performance with notable increase in the number of cycles before the decline to less than half the initial discharge capacity, as compared to those of Comparative Examples 1 to 3. Example 24 obtained the positive-electrode active material of lithium-manganese complex oxide containing boron and phosphorus by heat-treating the ingredient mixture at 250° C., the mixture containing lithium hydroxide LiOH, boron oxide $B_2O_3$, phosphoric acid-containing manganese dioxide $MnO_2$ and phosphoric acid-free manganese dioxide $MnO_2$.

Although the present invention has been fully described by way of examples, it is to be noted that various changes and modifications will be apparent to those skilled in the art. Therefore, unless otherwise such changes and modifications depart from the scope of the present invention, they should be construed as being included therein.

What is claimed is:

1. A lithium battery comprising a positive electrode, a negative electrode and a nonaqueous electrolyte containing a solute and a solvent, wherein said positive electrode comprises a positive-electrode active material of lithium-manganese complex oxide containing boron and phosphorus.

2. The lithium battery of claim 1, wherein said solute in the nonaqueous electrolyte comprises at least one substance selected from the group consisting of lithium trifluoromethanesulfonate, lithium trifluoromethanesulfonimide, lithium pentafluoroethanesulfonimide, lithium trifluoromethanesulfonmethide, and lithium hexafluorophosphate.

3. The lithium battery of claim 1, wherein said solute in the nonaqueous electrolyte comprises at least one substance selected from the group consisting of lithium trifluoromethanesulfonate and lithium trifluoromethanesulfonimide.

4. The lithium battery of claim 1, wherein said solvent in the nonaqueous electrolyte is a solvent mixture containing at least one organic solvent selected from the group consisting of ethylene carbonate, propylene carbonate, butylene carbonate, vinylene carbonate, γ-butyrolactone and sulfolane and at least one organic solvent selected from the group consisting of 1,2-dimethoxyethane, 1,2-diethoxyethane, 1,2-ethoxymethoxyethane, tetrahydrofuran, dioxolane, dimethyl carbonate, diethyl carbonate and ethylmethyl carbonate.

5. The lithium battery of claim 1, wherein said positive-electrode active material of lithium-manganese complex oxide containing boron and phosphorus is obtained by heat-treating a mixture of a boron compound, phosphorus compound, lithium compound and manganese compound in the presence of oxygen, the mixture containing boron, phosphorus, lithium and manganese in an atomic ratio (B:P:Li:Mn) of 0.01–0.20:0.01–0.10:0.1–2.0:1.

6. The lithium battery of claim 5, wherein said heat-treatment is performed at temperatures of 150° C. to 430° C.

7. The lithium battery of claim 5, wherein said heat-treatment is performed at temperatures of 250° C. to 430° C.

8. The lithium battery of claim 5, wherein said heat-treatment is performed at temperatures of 300° C. to 430° C.

9. The lithium battery of claim 5, wherein said boron compound is at least one compound selected from the group consisting of boron oxide $B_2O_3$, boric acid $H_3BO_3$, metaboric acid $HBO_2$, lithium metaborate $LiBO_2$ and quaternary lithium borate $Li_2B_4O_7$.

10. The lithium battery of claim 5, wherein said phosphorus compound is at least one compound selected from the group consisting of phosphoric acid $H_3PO_4$ and lithium phosphate $Li_3PO_4$.

11. The lithium battery of claim 5, wherein said lithium compound is at least one compound selected from the group consisting of-lithium hydroxide LiOH, lithium carbonate $Li_2CO_3$, lithium oxide $Li_2O$ and lithium nitrate $LiNO_3$.

12. The lithium battery of claim 5, wherein. said manganese compound is at least one compound selected from the group consisting of manganese dioxide $MnO_2$ and manganese oxyhydroxide MnOOH.

13. The lithium battery of claim 1, wherein said negative electrode comprises a negative-electrode active material comprising at least one substance selected from the group consisting of lithium metals, lithium alloys, carbon materials capable of absorbing and desorbing lithium ions.

14. The lithium battery of claim 1, wherein said negative electrode comprises a negative-electrode active material of an alloy of lithium and aluminum.

* * * * *